(12) United States Patent
Rakshit et al.

(10) Patent No.: US 12,368,513 B2
(45) Date of Patent: Jul. 22, 2025

(54) GEO-RESTRICTED DATA MANAGEMENT IN SATELLITE CONSTELLATION DATACENTERS

(71) Applicant: International Business Machines Corporation, Armonk, NY (US)

(72) Inventors: Sarbajit K. Rakshit, Kolkata (IN); Naeem Altaf, Round Rock, TX (US); Minsik Lee, Fort Lee, NJ (US); Joseph Dean Cockroft, Kihei, HI (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 18/161,602

(22) Filed: Jan. 30, 2023

(65) Prior Publication Data

US 2024/0259100 A1    Aug. 1, 2024

(51) Int. Cl.
*H04B 10/29* (2013.01)

(52) U.S. Cl.
CPC ................... *H04B 10/29* (2013.01)

(58) Field of Classification Search
CPC .... H04B 10/118; H04B 10/29; H04B 7/1858; H04B 7/19
See application file for complete search history.

(56) References Cited

U.S. PATENT DOCUMENTS

| | | | | |
|---|---|---|---|---|
| 4,985,706 A | * | 1/1991 | Schukat | H04L 23/02 |
| | | | | 244/1 R |
| 6,023,605 A | * | 2/2000 | Sasaki | H04B 7/195 |
| | | | | 455/430 |
| 6,104,911 A | * | 8/2000 | Diekelman | H04B 7/18534 |
| | | | | 455/12.1 |
| 10,727,949 B2 | | 7/2020 | Kay et al. | |
| 11,012,157 B2 | | 5/2021 | Kay et al. | |
| 12,273,209 B2 | * | 4/2025 | Salazar | H04L 12/40045 |

(Continued)

OTHER PUBLICATIONS

Teae Hyung Kim, "Satellite Communications, Geospatial Data and Geo Portal for Disaster Risk Reduction and Sustainable Development," ICT and Disaster Risk Reduction Division (IDD), United Nations ESCAP, Dated Mar. 8, 2016, pp. 1-39.

(Continued)

*Primary Examiner* — Tanya T Motsinger
(74) *Attorney, Agent, or Firm* — Patterson + Sheridan, LLP

(57) ABSTRACT

Disclosed embodiments provide systems and methods for implementing enhanced geo-restricted data management in satellite constellation datacenters. A disclosed system and methods implement a satellite constellation datacenter of multiple LEO satellites that enables real-time satellite communications using lasers and secure data storage in the satellite constellation datacenter to protect critical data from unauthorized access and supports secure data transfer between the LEO satellites using laser based data transfer. To enable secure storage of geo-location restricted data in a LEO satellite, the LEO satellite constellation datacenter defines a geo-location cone and requires that the geo-location restricted data be stored within the geo-location cone. LEO satellites within the defined geo-location cone store the geo-location restricted data and securely transfer the geo-location restricted data from one satellite to another satellite within the defined geo-location cone.

20 Claims, 6 Drawing Sheets

(56) References Cited

U.S. PATENT DOCUMENTS

| | | | | |
|---|---|---|---|---|
| 2014/0266872 | A1* | 9/2014 | Mitola, III | H04B 7/18521 |
| | | | | 342/356 |
| 2018/0310124 | A1* | 10/2018 | Regan | H04W 4/021 |
| 2022/0137235 | A1 | 5/2022 | Dundorf et al. | |
| 2022/0247486 | A1* | 8/2022 | Iyer | H04B 7/18541 |
| 2022/0363416 | A1* | 11/2022 | Mukae | G06Q 30/0283 |
| 2022/0371754 | A1* | 11/2022 | Mukae | G06Q 10/04 |
| 2023/0268987 | A1* | 8/2023 | Moyal | G06N 7/01 |
| | | | | 342/352 |
| 2024/0143624 | A1* | 5/2024 | Patel | H04B 7/185 |
| 2024/0195495 | A1* | 6/2024 | Sajassi | H04B 7/18584 |
| 2025/0141539 | A1* | 5/2025 | Mccormick | H04B 7/18532 |
| 2025/0142360 | A1* | 5/2025 | Xin | H04W 76/20 |

OTHER PUBLICATIONS

Albert Greenberg, David A. Maltz, "What Goes Into a Data Center?" Microsoft Research, Year: 2018, pp. 1-94.

Authors et al., "Method and Apparatus for Dynamic Data Transformation Service for LEO Data Processing Locations," ip.com, IP.com No. IPCOM000270992D, Dated Sep. 24, 2022, pp. 1-5.

Authors et al., "Method and System for Context Aware Relative Repositioning of Satellites in Same Orbit," ip.com, IP.com No. IPCOM000270628D, Dated: Jul. 23, 2022, pp. 1-5.

Authors et al., "Data Locality with Apache Flight Services at Satellite Location," ip.com, IP.com No. IPCOM000268173D, Dated: Jan. 4, 2022, pp. 1-3.

Authors et al.: Alan Scott, "Multi-Use Optical Ground Station," ip.com, IP.com No. IPCOM000264887D, Dated: Feb. 4, 2021, pp. 1-6.

"Bursting the Clouds for better communication," University of Geneva, Phys.org, Dated: Oct. 18, 2018, pp. 1-2 https://phys.org/news/2018-10-clouds.html.

Caleb Henry, "Getting the cloud above the clouds (and surviving a dry spell)," SpaceNews, Dated Jan. 18, 2018, pp. 1-4.

Patrick Nelson, "Lasers will allow real-time satellite communications," Network World, Dated: Apr. 30, 2015, pp. 1-3.

Patrick Nelson, "NASA to use data lasers to beam data from space to Earth," NetworkWorld, Dated: Aug. 30, 2018, pp. 1-3.

"SES Networks Enables Direct Connectivity to IBM Cloud via Global Satellite Network," Business Wire via ITWeb, Luxembourg, Dated Oct. 4, 2018, pp. 1-2.

Yevgeniy Sverdlik, "Space: The Ultimate Network Edge," DataCenter Knowledge, Dated: Oct. 17, 2016, pp. 1-7.

Bill Tolson, "What is Data Sovereignty and The GDPR: Do You Know Where Your Data is Located?" Archive360, Dated: Feb. 14, 2019, pp. 1-7.

"SpaceBelt Data Security as a Service," SpaceBelt: Cloud Constellation Corporation, Date Accessed: Jan. 23, 2023, pp. 1-10.

"ESA and SES-led Consortium to Develop Satellite-based Cybersecurity," SES, Luxembourg, Dated: May 3, 2018, pp. 1-5.

SES Networks, "Quantum Cryptography Telecommunication System (Quartz)," Dated Accessed: Jan. 24, 2023, pp. 1-1 https://www.ses.com/press-release/esa-and-ses-led-consortium-develop-satellite-based-cybersecurity.

SES Networks, "Connectivity to The IBM Cloud," SES Networks/IBM Partnership Benefits, Date Accessed: Jan. 24, 2023, pp. 1-1.

* cited by examiner

600

```
┌─────────────────────────────────────────────────────────────┐
│ STORE UNIQUE IDENTIFICATION OF THE GEOSTATIONARY SATELLITES │
│         BY LEO SATELLITE CONSTELLATION DATACENTER           │
│                            602                              │
└─────────────────────────────────────────────────────────────┘
```

```
┌─────────────────────────────────────────────────────────────┐
│  IDENTIFY GEOSTATIONARY SATELLITE(S) PRESENT IN THE         │
│               GEO-LOCATION CONE PLANE                       │
│                           604                               │
└─────────────────────────────────────────────────────────────┘
```

```
┌─────────────────────────────────────────────────────────────┐
│ TRANSFER THE GEO-RESTRICTED DATA FROM ONE SATELLITE TO      │
│ ANOTHER SATELLITE WITHIN THE GEO-LOCATION CONE PLANE USING  │
│ A MULTI-FACTOR AUTHENTICATION AND MULTI-SATELLITE           │
│        AUTHENTICATION WITH ROTATING PASSWORDS               │
│                           606                               │
└─────────────────────────────────────────────────────────────┘
```

```
┌─────────────────────────────────────────────────────────────┐
│ TRACT HOW THE GEO-RESTRICTED DATA IS RETAINED WITHIN THE    │
│ GEO-LOCATION CONE AND HOW THE LEO SATELLITES EXCHANGE THE   │
│ GEO-RESTRICTED DATA WITH EACH OTHER BASED ON BLOCKCHAIN TO  │
│ MAINTAIN GEO-RESTRICTED DATA STORAGE LOCATION WITHIN THE    │
│              GEO-LOCATION CONE PLANE                        │
│                           608                               │
└─────────────────────────────────────────────────────────────┘
```

```
┌─────────────────────────────────────────────────────────────┐
│ IDENTIFY SPECIFIC GEO-RESTRICTED DATA NOT REQUIRED          │
│ FREQUENTLY (DATA USAGE BELOW A THRESHOLD FREQUENCY) AND     │
│ TRANSFER THE SPECIFIC RESTRICTED DATA TO A GEOSTATIONARY    │
│                        SATELLITE                            │
│                           610                               │
└─────────────────────────────────────────────────────────────┘
```

FIG. 6

GEO-RESTRICTED DATA MANAGEMENT IN SATELLITE CONSTELLATION DATACENTERS

BACKGROUND

The present invention relates to data management and more specifically to geo-restricted data management in a Low Orbit Earth (LEO) satellite constellation datacenter.

Low-earth orbit (LEO)-satellite concepts, which orbit 500 to 2,000 kilometers from Earth, offer faster communications with lower latency than geostationary (GEO) satellites. LEO satellites have a circular or elliptical orbit at a height of 250-2000 km from the Earth surface. The orbit period, depending on altitude, varies between 90-120 minutes. As the altitude of LEO satellites is low, the velocity is very high (>25,000 km/h) and they make 12-16 Earth turns per Earth day. Storing data in geostationary satellite or GEO satellite generally causes latency.

Research efforts at the European Space Agency (ESA) and a consortium are ongoing to develop a proposed system that will allow the use of encryption keys from space and secure transmission to users on Earth using lasers. NASA intends to shift its space-to-ground data communications from traditional radio frequency to laser.

Data residency is where a business specifies that their data is stored in a specific geographic location of their choice. For example, a business may limit their data storage to a specific country. Data sovereignty differs from data residency in that not only is the data stored in a designated location (e.g., due to regulatory requirements) but the data is also subject to the laws of the country in which it is physically stored. Data subjects have different privacy and security protections according to where the data centers are located. For example, some nations require local storage and highly regulate how, or if the data can be moved out of the country and for what reason.

SUMMARY

Embodiments of the present disclosure provide a system and methods for implementing geo-restricted data management in a satellite constellation datacenter, enabling secure data storage.

A non-limiting method stores geo-location restricted data at a Low Orbit Earth (LEO) satellite constellation datacenter. The LEO satellite constellation datacenter defines a geo-location cone extending from a given geographic location boundary across multiple satellite orbital altitudes. The satellite constellation datacenter requires that the geo-location restricted data be stored within the geo-location cone. The LEO satellite constellation datacenter identifies LEO satellites within the defined geo-location cone to store the geo-location restricted data. The LEO satellite constellation datacenter identifies a first satellite from the LEO satellites storing the geo-location restricted data. The LEO satellite constellation datacenter identifies a given time for the first satellite to move outside the defined geo-location cone to become unavailable for storing the geo-location restricted data. The LEO satellite constellation datacenter identifies a second satellite from the LEO satellites available within the defined geo-location cone at the given time for storing the geo-location restricted data. The LEO satellite constellation datacenter transfers, using laser based data transfer, the restricted data from the first satellite to the second satellite at or before the given time.

Other disclosed embodiments include a computer system and computer program product for implementing geo-restricted data management in satellite constellation datacenters implementing features of the above-disclosed method.

BRIEF DESCRIPTION OF THE DRAWINGS

FIG. 6 is a flow chart illustrating further example operations of creating geo-location cone and transferring restricted data of a method for implementing geo-restricted data management in satellite constellation datacenters of one or more disclosed embodiments.

DETAILED DESCRIPTION

Figure 1:
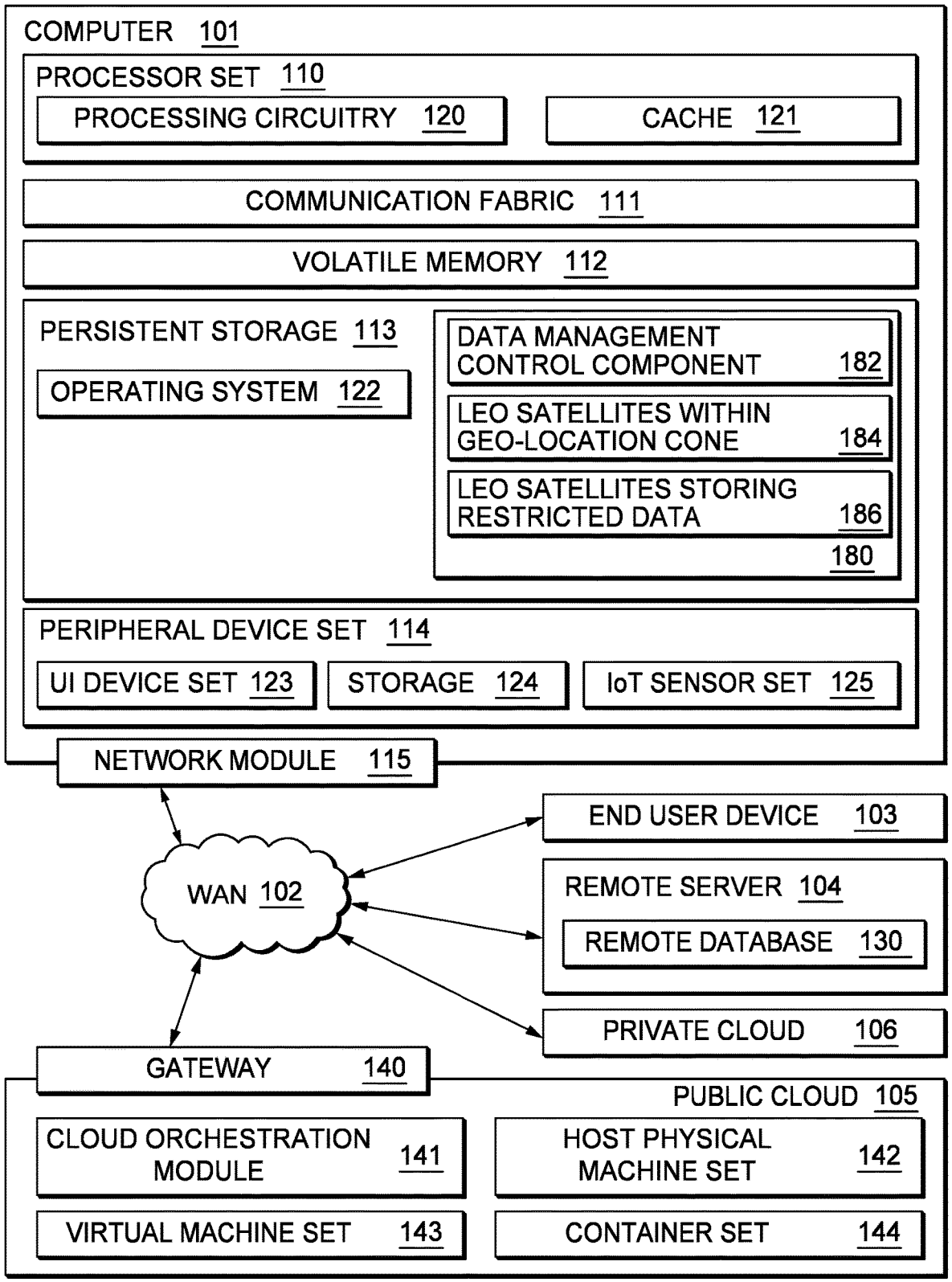
FIG. 1 is a block diagram of an example computer environment for use in conjunction with one or more disclosed embodiments for implementing geo-restricted data management in satellite constellation datacenters.

Embodiments of the present disclosure provide a system and methods for implementing geo-restricted data management in a satellite constellation datacenter, enabling secure data storage. In a disclosed embodiment, a LEO satellite constellation datacenter stores geo-location restricted data. The LEO satellite constellation datacenter defines a virtual geo-location cone extending from a given geographic location boundary across multiple satellite orbital altitudes, such as orbits from a Low Earth Orbit to geostationary (GEO) orbit. The satellite constellation datacenter requires that the geo-location restricted data be stored within the geo-location cone. For example, a given geographic location boundary for the geo-location cone may include a specific country such as India, or region such as North America. The LEO satellite constellation datacenter ensures the geo-location restricted data is present within the defined geo-location cone in orbital altitude LEO satellites. LEO satellites, which move out of the geo-location cone, transfer the stored geo-location restricted data to another LEO satellite available inside the geo-location cone, so that geo-location restricted data can always be present within the defined geo-location cone.

In a disclosed embodiment, the LEO satellite constellation datacenter can identify which satellites will be available within the defined geo-location cone, and the time range of availability within the geo-location cone. In one embodiment, the LEO satellites use laser based data transfer and transfer data from one LEO satellite to another LEO satellite, maintaining the geo-location restricted data within the defined geo-location cone.

In a disclosed embodiment, the LEO satellite constellation datacenter can use multi-factor authentication (MFA) and multi-satellite authentication with rotating passwords backed by blockchain to identify and ensure that the geo-location restricted data storage location policy is maintained. The LEO satellite constellation datacenter can identify usage frequency of the geo-location restricted data, and accordingly when the geo-location restricted data is not used frequently, this geo-location restricted data can be moved to one or more geostationary GEO satellites within the geo-location cone. As a result, laser based data transfer from one LEO Satellite to another LEO satellite, or LEO satellite data hopping, is not required.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a Data Management Control Component 182, LEO Satellites Within the Geo-Location Cone 184, and LEO Satellites Storing Geo-Restricted Data 186 at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments of the present disclosure provide a system and methods for implementing a satellite constellation datacenter that enables real-time satellite communications using lasers and secure data storage in the satellite constellation datacenter to protect critical data from unauthorized access. To enable secure storage of geo-location restricted data in a LEO satellite, a LEO satellite constellation of multiple LEO satellites is provided with the capability to protect critical data from unauthorized access and to support secure communications between the LEO satellites.

A non-limiting method stores geo-location restricted data at a Low Orbit Earth (LEO) satellite constellation datacenter. The LEO satellite constellation datacenter defines a geo-location cone extending from a given geographic location earth boundary across multiple satellite orbital altitudes. The LEO satellite constellation datacenter requires that the geo-location restricted data be stored with the geo-location cone. The LEO satellite constellation datacenter identifies LEO satellites within the defined geo-location cone to store the geo-location restricted data. The LEO satellite constellation datacenter identifies a first satellite from the LEO satellites storing the geo-location restricted data. The LEO satellite constellation datacenter identifies a given time for the first satellite to move outside the defined geo-location cone to become unavailable for storing the geo-location restricted data. The LEO satellite constellation datacenter identifies a second satellite from the LEO satellites available within the defined geo-location cone at the given time for storing the geo-location restricted data. The LEO satellite constellation datacenter transfers, using laser based data transfer, the restricted data from the first satellite to the second satellite at or before the given time.

A non-limiting disclosed method stores geo-location restricted data at a Low Orbit Earth (LEO) satellite constellation datacenter. The LEO satellite constellation datacenter defines a virtual geo-location cone extending from a given geographic location earth boundary across multiple satellite orbital altitudes and requires that the geo-location restricted data be stored within the geo-location cone. For example, the given geographic location earth boundary can include a specific country or a specific region including multiple countries. The LEO satellite constellation datacenter identifies LEO satellites within the defined geo-location cone to store the geo-location restricted data. The LEO satellite constellation datacenter identifies a first satellite from the LEO satellites storing the geo-location restricted data. The LEO satellite constellation datacenter, for example can use blockchain to track how the geo-restricted data is retained within the geo-location cone and how the LEO satellites exchange data with each other. The LEO satellite constellation datacenter identifies a given time for the first satellite to move outside the defined geo-location cone to become unavailable for storing the geo-location restricted data. The LEO satellite constellation datacenter identifies a second satellite from the LEO satellites available within the defined geo-location cone at the given time for storing the geo-location restricted data. The LEO satellite constellation datacenter transfers the restricted data from the first satellite to the second satellite at or before the given time using laser based data transfer. The LEO satellite constellation datacenter can identify which geo-restricted data is not required frequently (e.g., the usage geo-restricted data is below a set usage frequency) and can transfer the geo-restricted data to geostationary GEO satellites.

Figure 2:
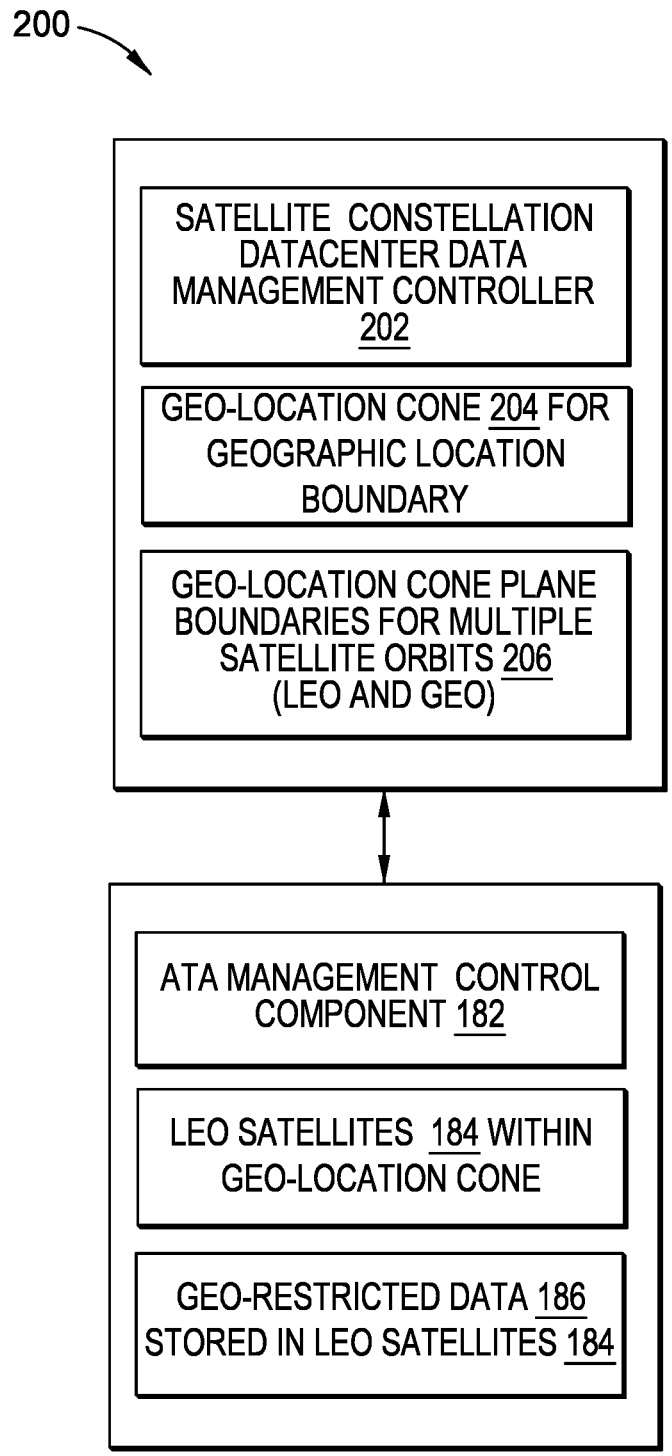
FIG. 2 is a block diagram of an example system for implementing geo-restricted data management in satellite constellation datacenters of one or more disclosed embodiments.

FIG. 2 illustrates an example system 200 for implementing geo-restricted data management in satellite constellation datacenters of one or more disclosed embodiments. System 200 can be used in conjunction with the computer 101 and cloud environment of the computing environment 100 of FIG. 1 for implementing geo-restricted data management in satellite constellation datacenters.

Satellite Constellation Datacenter System 200 includes a Satellite Constellation Datacenter Controller 202 and a stored library of at least one Geo-Location Cone 204 for Geographic Location Boundary, and Multiple Satellite Orbits 206 within the Geo-Location Cone 204. Each Geo-Location Cone 204 defines cone boundaries for multiple geo-location cone planes for the Multiple Satellite Orbits 206 to implement geo-restricted data management in a satellite constellation datacenter. Satellite Constellation Datacenter System 200 includes a Data Management Control Component 182, LEO Satellites 184 within the Geo-Location Cone, and Geo-Restricted Data 186 stored in LEO Satellites 184, for example used together with Satellite Constellation Datacenter Controller 202 to implement methods of disclosed embodiments.

Satellite Constellation Datacenter System 200 stores geo-location restricted data within a given defined geo-location cone and ensures the data is present within the defined geo-location cone in different orbital altitude LEO satellites 184. Satellite Constellation Datacenter System 200 identifies LEO satellites 184 that are available within the defined geo-location cone 204 and the time range of availability within the geo-location cone. The LEO satellites 184 use laser based data transfer for transferring geo-location restricted data 186 from one LEO satellite 184 leaving the defined geo-location cone 204 to another available LEO satellite within the geo-location cone. In one embodiment, the satellite Constellation Datacenter System 200 uses multi-factor authentication (MFA) and multi-satellite authentication with rotating passwords backed via blockchain to identify and securely transfer the geo-location restricted data 186.

Figure 3:
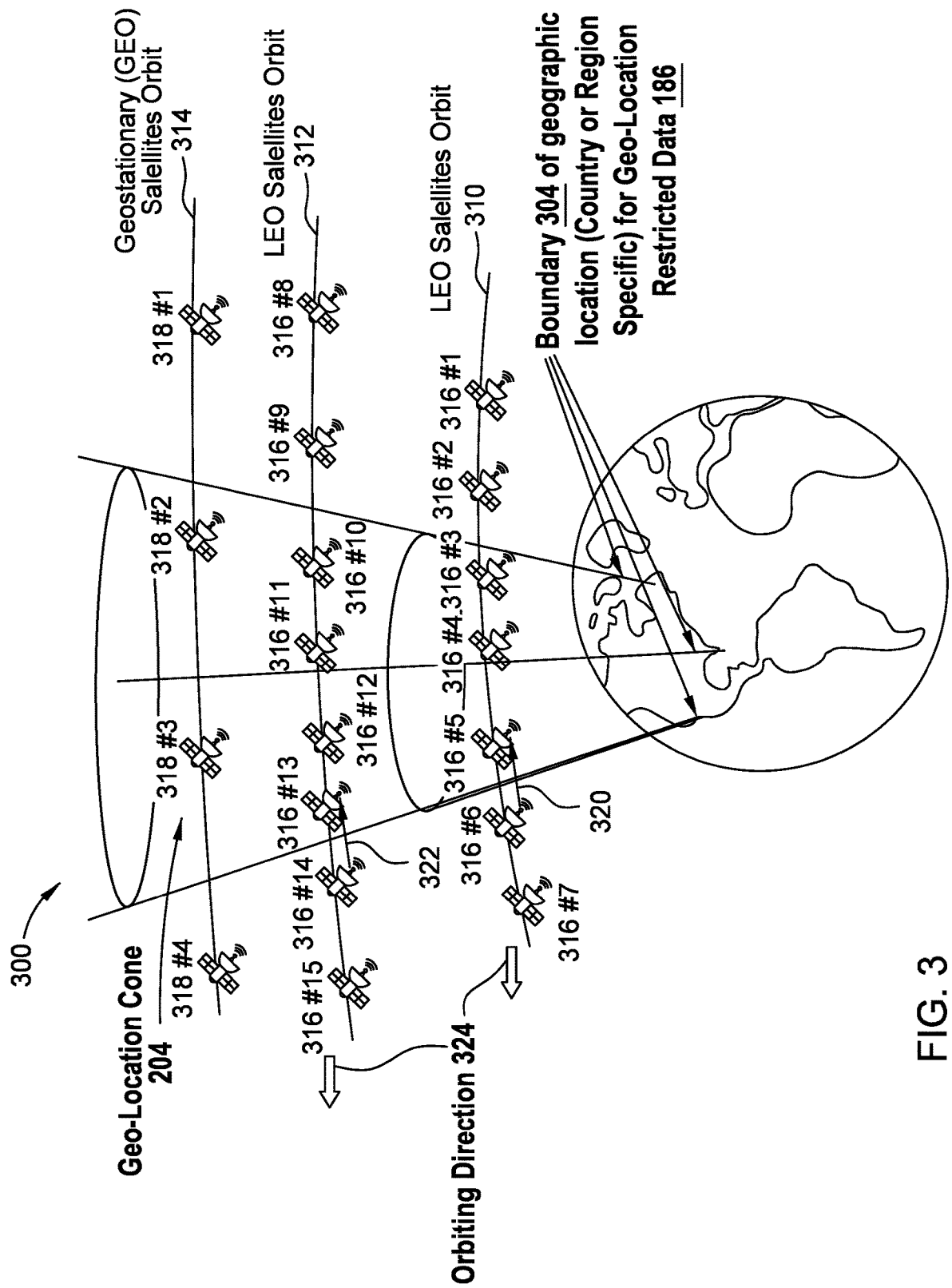
FIG. 3 is a diagram schematically illustrating operations of the system of FIG. 2 for implementing geo-restricted data management in satellite constellation datacenters of one or more disclosed embodiments.

FIG. 3 schematically illustrates example operations 300 of Satellite Constellation Datacenter System 200 to implement geo-restricted data management. Satellite Constellation Datacenter System 200 retains geo-restricted data 186 in satellites within a defined Geo-Location Cone 204, such as illustrated in FIG. 3. Geo-Location Cone 204 extends outwardly from a given geographic location Earth boundary 304 (e.g., as shown for a region comprising North America) through multiple satellite orbital altitudes, such as orbits through a first LEO satellite orbit 310, a second LEO satellite orbit 312, and a geostationary (GEO) satellite orbit 314. It should be understood that the Geo-Location Cone 204 is not limited to a conical shape and can be defined by various shapes, such as a rectangular, pentagon, etc. The defined Geo-Location Cone 204 can track (exactly or approximately) the boundaries of a given country or region, and is not limited to a conical-shaped geographic location Earth boundary, such as the illustrated geographic location Earth boundary 304. As shown, Satellite Constellation Datacenter System 200 includes a plurality of LEO satellites 316, #1-16 illustrated in LEO satellite orbits 310, 312 include LEO satellites 316, #3-5 in LEO satellite orbit 310 and LEO satellites 316, #10-13 in LEO satellite orbits 312 within the illustrated Geo-Location Cone 304.

Satellite Constellation Datacenter System 200 ensures the geo-location restricted data 186 is present within the defined geo-location cone 204 in different orbital altitude LEO satellites 184, such as LEO satellites 316, #3-5 in LEO satellite orbit 310 and LEO satellites 316, #10-13 in LEO satellite orbit 312 within the defined geo-location cone. LEO satellites 184, such as LEO satellite 316, #6 and LEO satellite 316, #16 that move out of the geo-location cone 184 can transfer the stored geo-location restricted data to another LEO satellite available inside the geo-location cone, such as LEO satellite 316, #5 and LEO satellite 316, #15 using laser data transfer between the LEO satellites. A pair of arrows labeled 320, 322 represents such transfer of geo-location restricted data 186 with satellite orbiting direction represented by adjacent respective arrows labeled LEO satellite Orbiting Direction 324. The data transfer from one exiting LEO satellite 316 to another available LEO satellite 316 within the geo-location cone 184 enables the geo-location restricted data 186 to remain present and available in respective LEO satellites 316 within the defined geo-location cone 184.

Satellite Constellation Datacenter System 200 can transfer the Geo-restricted data 186 from one LEO satellite to another LEO satellite using multi-factor authentication and multi-satellite authentication with rotating passwords. In a disclosed embodiment, Satellite Constellation Datacenter System 200 uses blockchain to track how the geo-restricted data 186 is always retained within the geo-location cone 204 and how the LEO satellites 316 are exchanging data with each other. Satellite Constellation Datacenter System 200 maintains the Geo-restricted data 186 within the geo-location cone 204 to be always stored and available in identified orbital altitude LEO satellites 184.

Figure 4:
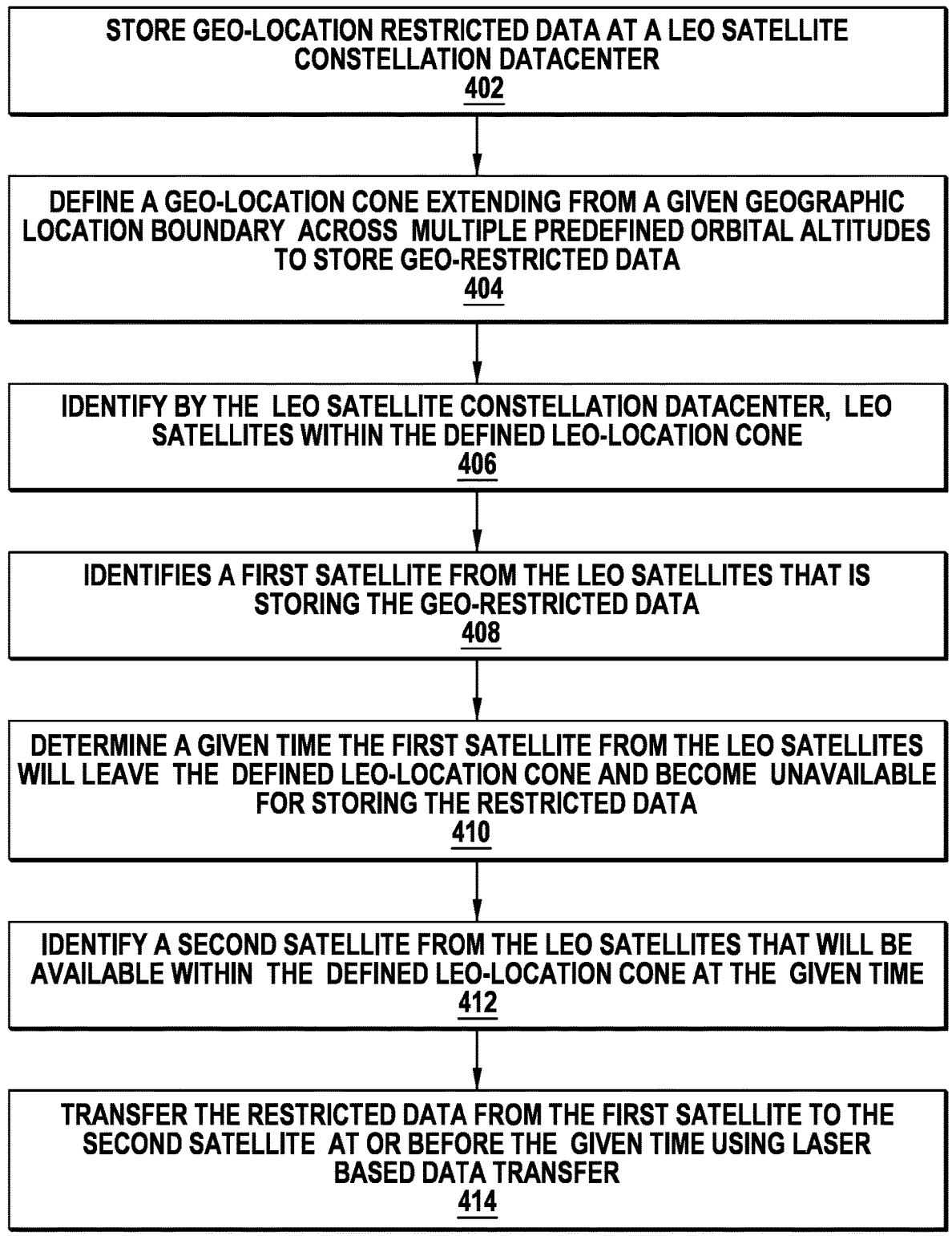
FIG. 4 is a flow chart illustrating example operations of a method for implementing geo-restricted data management in satellite constellation datacenters of one or more disclosed embodiments.

FIG. 4 illustrates an example method 400 for implementing geo-restricted data management in satellite constellation datacenters of one or more disclosed embodiments. Satellite Constellation Datacenter System 200 can implement method 400 with Satellite Constellation Datacenter Controller 202 together with Data Management Control Component 182, LEO Satellites 184 within the Geo-Location Cone, and Geo-Restricted Data 186 stored in LEO Satellites 184. At block 402, Satellite Constellation Datacenter System 200 stores geo-location restricted data in at least one LEO satellites 316 of the LEO Satellite Constellation Datacenter.

At block 404, Satellite Constellation Datacenter System 200 defines a geo-location cone 184 for a specific geographic location boundary cutting across various orbital altitudes as illustrated and described above. At block 406, Satellite Constellation Datacenter System 200 identifies the LEO satellites 184 of the LEO Satellite Constellation Datacenter within the Geo-Location Cone 204. While the LEO satellites 184 are orbiting, and the Earth is spinning, Satellite Constellation Datacenter System 200 stores a unique identification of each of the LEO satellites that is used to identify their relative position in the low earth orbit and to identify the LEO satellites within the Geo-Location Cone 204. Satellite Constellation Datacenter System 200 identifies which satellites will be available within the virtual Geo-Location Cone 204, and the time range of availability within the Geo-Location Cone 204.

At block 408, Satellite Constellation Datacenter System 200 identifies a first LEO satellite 184 from the LEO satellites within the defined geo-location cone storing the geo-location restricted data. At block 410, Satellite Constellation Datacenter System 200 identifies a given time when the first LEO satellite 184 will leave the Geo-Location Cone 204 and be unavailable within the Geo-Location Cone for storing geo-location restricted data. At block 410, Satellite Constellation Datacenter System 200 identifies a second LEO satellite 184 from the LEO satellites available within the defined geo-location cone storing the geo-location restricted data at the given time. At block 410, Satellite Constellation Datacenter System 200 controls the data transfer of the geo-location restricted data from the first LEO satellite to the second LEO satellite at or before the given time using laser based data transfer.

Figure 5:
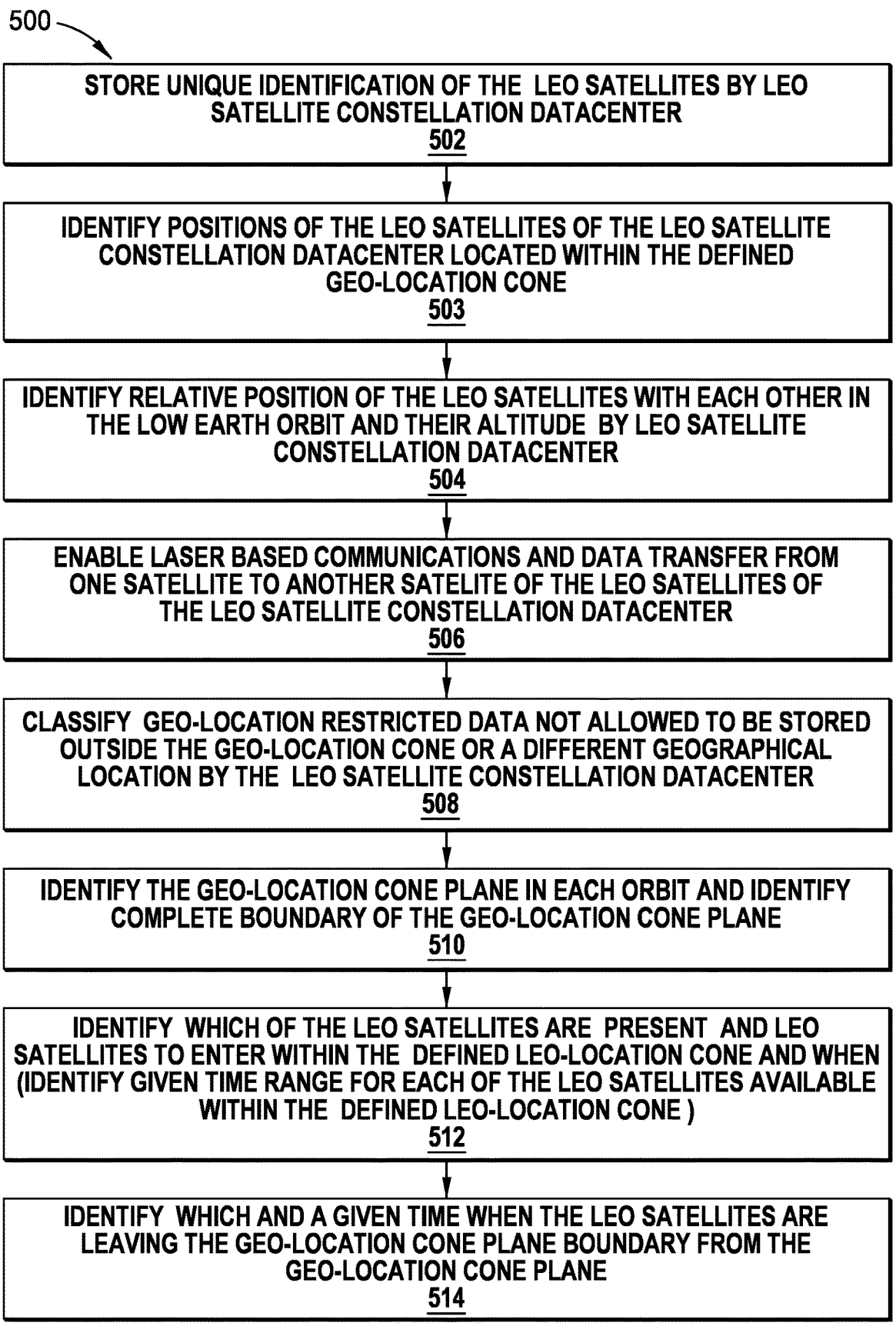
FIG. 5 is a flow chart illustrating further example operations of identifying LEO satellites positions and transferring geo-location restricted data of a method for implementing geo-restricted data management in satellite constellation datacenters of one or more disclosed embodiments.

FIG. 5 illustrates an example method 500 including further example operations of identifying LEO satellites positions and transferring geo-location restricted data for implementing geo-restricted data management in satellite constellation datacenters of one or more disclosed embodiments. Satellite Constellation Datacenter System 200 can implement method 500 with Satellite Constellation Datacenter Controller 202 together with Data Management Control Component 182, LEO Satellites 184 within the Geo-Location Cone, and Geo-Restricted Data 186 stored in LEO Satellites 184.

At block 502, Satellite Constellation Datacenter System 200 stores a unique identification of each of the LEO satellites. At block 503, Satellite Constellation Datacenter System 200 identifies the positions of the LEO Satellites 184 within the Geo-Location Cone 204. At block 504, Satellite Constellation Datacenter System 200 identifies the relative positions of the LEO Satellites 184 with each other in the in the low earth orbit. At block 506, Satellite Constellation Datacenter System 200 enables laser-based communications with each other and laser based data transfer from one LEO satellite to another LEO satellite. Laser based can be used for transferring data to and from a ground station (not shown) with the LEO satellites 184.

At block 508, Satellite Constellation Datacenter System 200 classifies the geo-location restricted data, which is not allowed to be stored outside the Geo-Location Cone 204 or a different specific geographic location boundary than the Geo-Location Cone. At block 510, Satellite Constellation Datacenter System 200 identifies the Geo-location cone plane in each GEO orbit and a complete boundary of the Geo-location cone plane. At block 512, Satellite Constellation Datacenter System 200 identifies which LEO satellites 184 are present in the Geo-Location Cone 204 and which LEO satellites 184 will be entering the Geo-Location Cone 204 and when (i.e., identifying a given time range for each of the LEO satellites available within the Geo-Location Cone 204.) At block 512, Satellite Constellation Datacenter System 200 identifies which LEO satellites 184 and a given time when the LEO satellites 184 are leaving the plane boundary from the Geo-Location Cone 204.

FIG. 6 illustrates an example method 600 including further example operations of creating geo-location cone and transferring restricted data of a method for implementing geo-restricted data management in satellite constellation datacenters of one or more disclosed embodiments. Satellite Constellation Datacenter System 200 can implement method 600 with Satellite Constellation Datacenter Controller 202 together with Data Management Control Component 182, LEO Satellites 184 within the Geo-Location Cone, and Geo-Restricted Data 186 stored in LEO Satellites 184.

At block 602, Satellite Constellation Datacenter System 200 stores a unique identification of each of the geostationary GEO satellites 318, as illustrated in FIG. 3. At block 604, Satellite Constellation Datacenter System 200 identifies the geostationary GEO satellites 318 in the GEO satellites orbit 314 within the Geo-Location Cone 204, such as geostationary GEO satellites 318, #2 and #3. At block 606, Satellite Constellation Datacenter System 200 transfers Geo-Restricted Data 186 from one LEO satellite to another LEO satellite using multi-factor authentication (MFA) and multi-satellite authentication with rotating passwords based on blockchain. One disclosed embodiment of Geo-Restricted Data transfer is illustrated and described with respect to FIG. 4. At block 608, Satellite Constellation Datacenter System 200 tracks how the Geo-Restricted Data 186 is retained within the Geo-Location Cone 204 and how the LEO satellites exchange data with each other based on blockchain to maintain the Geo-Location Restricted Data 186 within the Geo-Location Cone.

At block 610, Satellite Constellation Datacenter System 200 identifies usage of Geo-Restricted Data 186 below a set threshold frequency (e.g., Geo-Restricted Data not required frequently) and transfers the Geo-restricted data to a geostationary orbit satellite such as one of the illustrated geostationary GEO satellites 318, #2 and #3 within the Geo-Location Cone 204. Satellite Constellation Datacenter System 200 by analyzing the usage frequency of the geo-location restricted data and transferring the Geo-restricted data to GEO satellites within the Geo-Location Cone 204, avoiding data hopping from one LEO Satellite to another LEO satellite for such infrequently required Geo-Restricted Data.

While the foregoing is directed to embodiments of the present invention, other and further embodiments of the invention may be devised without departing from the basic scope thereof, and the scope thereof is determined by the claims that follow.

What is claimed is:
1. A method comprising:
storing geo-location restricted data at a Low Orbit Earth (LEO) satellite constellation datacenter;
identifying a geo-location cone extending from a given geographic location earth boundary through multiple satellite orbital altitudes, the satellite constellation datacenter requires that the geo-location restricted data be stored within the geo-location cone;
identifying LEO satellites within the defined geo-location cone for storing the geo-location restricted data;
identifying a first satellite from the LEO satellites storing the geo-location restricted data;
identifying a given time for the first satellite to move outside the defined geo-location cone;
identifying a second satellite from the LEO satellites that will still be within the defined geo-location cone at the given time; and
transferring, using laser based data transfer, the geo-location restricted data from the first satellite to the second satellite within the defined geo-location cone at, or before, the given time.

2. The method of claim 1, further comprising:
identifying usage of the geo-location restricted data below a threshold frequency; and
transferring, using laser based data transfer, the geo-location restricted data to a geostationary (GEO) satellite within the defined geo-location cone.

3. The method of claim 1, comprises storing a unique identification for each LEO satellites, and wherein identifying LEO satellites within the defined geo-location cone for storing the geo-location restricted data is based on the unique identification for each LEO satellites.

4. The method of claim 1, wherein identifying LEO satellites within the defined geo-location cone further comprises identifying a relative position between the LEO satellites.

5. The method of claim 1, wherein the given geographic location earth boundary comprises a boundary of one or a specific country and a region of a group of countries for defining the geo-location cone.

6. The method of claim 1, wherein the geo-location cone extends through one or more LEO satellite orbits and a geostationary GEO satellite orbit.

7. The method of claim 1, wherein transferring the geo-location restricted data from the first satellite to the second satellite is based on multi-factor authentication (MFA) and multi-satellite authentication with rotating passwords backed via blockchain.

8. The method of claim 7, wherein transferring the geo-location restricted data from the first satellite to the second satellite inside the said geo-location cone is based on blockchain to maintain the geo-location restricted data within the defined geo-location cone.

9. The method of claim 1, further comprises using blockchain to track the geo-location restricted data stored within the geo-location cone and to track the LEO satellites transferring geo-location restricted data with each other.

10. The method of claim 1, wherein identifying LEO satellites within the defined geo-location cone for storing the geo-location restricted data comprise identified LEO satellites within the LEO satellite constellation datacenter.

11. A system, comprising:
a processor; and
a memory, wherein the memory includes a computer program product configured to perform operations for implementing geo-restricted data management in satellite constellation datacenters, the operations comprising:
storing geo-location restricted data at a Low Orbit Earth (LEO) satellite constellation datacenter;
identifying a geo-location cone extending from a given geographic location earth boundary through multiple satellite orbital altitudes, the satellite constellation datacenter requires that the geo-location restricted data be stored within the geo-location cone;
identifying LEO satellites within the defined geo-location cone for storing the geo-location restricted data;
identifying a first satellite from the LEO satellites storing the geo-location restricted data;
identifying a given time for the first satellite to move outside the defined geo-location cone;
identifying a second satellite from the LEO satellites that will still be within the defined geo-location cone at the given time; and
transferring, using laser based data transfer, the geo-location restricted data from the first satellite to the second satellite within the defined geo-location cone at, or before, the given time.

12. The system of claim 11, further comprising:
identifying usage of the geo-location restricted data below a threshold frequency; and
transferring, using laser based data transfer, the geo-location restricted data to a geostationary (GEO) satellite within the defined geo-location cone.

13. The system of claim 11, further comprises storing a unique identification for each LEO satellites, and wherein identifying LEO satellites within the defined geo-location cone for storing the geo-location restricted data is based on the unique identification for each of the LEO satellites.

14. The system of claim 11, wherein the given geographic location earth boundary comprises a boundary of one or a specific country and a region of a group of countries for defining the geo-location cone.

15. The system of claim 11, comprises using blockchain to track the geo-location restricted data stored within the geo-location cone and to track the LEO satellites transferring geo-location restricted data with each other.

16. A computer program product for implementing geo-restricted data management in satellite constellation datacenters, the computer program product comprising:
a computer-readable storage medium having computer-readable program code embodied therewith, the computer-readable program code executable by one or more computer processors to perform an operation comprising:
storing geo-location restricted data at a Low Orbit Earth (LEO) satellite constellation datacenter;
identifying a geo-location cone extending from a given geographic location earth boundary through multiple satellite orbital altitudes, the satellite constellation datacenter requires that the geo-location restricted data be stored within the geo-location cone;
identifying LEO satellites within the defined geo-location cone for storing the geo-location restricted data;
identifying a first satellite from the LEO satellites storing the geo-location restricted data;
identifying a given time for the first satellite to move outside the defined geo-location cone;
identifying a second satellite from the LEO satellites that will still be within the defined geo-location cone at the given time; and
transferring, using laser based data transfer, the geo-location restricted data from the first satellite to the second satellite within the defined geo-location cone at, or before, the given time.

17. The computer program product of claim 16, further comprising:
identifying usage of the geo-location restricted data below a threshold frequency; and
transferring, using laser based data transfer, the geo-location restricted data to a geostationary (GEO) satellite within the defined geo-location cone.

18. The computer program product of claim 16, further comprises storing a unique identification for each LEO satellites, and wherein identifying LEO satellites within the defined geo-location cone for storing the geo-location restricted data is based on the unique identification for each of the LEO satellites.

19. The computer program product of claim 16, wherein the given geographic location earth boundary comprises a boundary of one or a specific country and a region of a group of countries for defining the geo-location cone.

20. The computer program product of claim 16, further comprises using blockchain to track the geo-location restricted data stored within the geo-location cone and to track the LEO satellites transferring geo-location restricted data with each other.

* * * * *